(12) United States Patent
Hamade et al.

(10) Patent No.: US 10,813,347 B2
(45) Date of Patent: Oct. 27, 2020

(54) FISHING MACHINE AND CONTROL METHOD OF FISHING MACHINE

(71) Applicant: TOWA DENKI SEISAKUSYO CO., LTD., Hakodate-shi, Hokkaido (JP)

(72) Inventors: Yuichi Hamade, Hakodate (JP); Tomohiro Miki, Hakodate (JP); Manabu Tamamori, Hakodate (JP); Kohei Watanabe, Hakodate (JP)

(73) Assignee: TOWA DENKI SEISAKUSYO CO., LTD., Hakodate-shi (JP)

( * ) Notice: Subject to any disclaimer, the term of this patent is extended or adjusted under 35 U.S.C. 154(b) by 135 days.

(21) Appl. No.: 16/217,476

(22) Filed: Dec. 12, 2018

(65) Prior Publication Data

US 2019/0110454 A1 Apr. 18, 2019

Related U.S. Application Data

(63) Continuation of application No. PCT/JP2017/001715, filed on Jan. 19, 2017.

(30) Foreign Application Priority Data

Jun. 15, 2016 (JP) ................... 2016-118454

(51) Int. Cl.
*A01K 89/01* (2006.01)
*A01K 89/017* (2006.01)
(Continued)

(52) U.S. Cl.
CPC ........ *A01K 89/017* (2013.01); *A01K 89/0186* (2015.05); *F16D 27/10* (2013.01); *F16D 2027/002* (2013.01)

(58) Field of Classification Search
CPC ............ A01K 89/017; A01K 89/01556; A01K 89/0186; A01K 89/01903; A01K 89/05;
(Continued)

(56) References Cited

U.S. PATENT DOCUMENTS 6,058,916 A * 5/2000 Ozawa .................... F02B 33/34
123/559.3
9,476,465 B2 * 10/2016 Hong .................... F16D 41/063
(Continued)

FOREIGN PATENT DOCUMENTS

JP 2002-291388 A 10/2002
JP 2007-104978 A 4/2007
(Continued)

OTHER PUBLICATIONS

International Search Report dated Feb. 28, 2017, issued in counterpart application No. PCT/JP2017/001715 (2 pages).

*Primary Examiner* — Emmanuel M Marcelo
(74) *Attorney, Agent, or Firm* — Westerman, Hattori, Daniels & Adrian, LLP

(57) ABSTRACT

A fishing machine includes a rotary drum for winding a fishing line, capable of rotating in a reeling direction and in a unreeling direction, a drive motor for rotating the rotary drum in the reeling direction and in the unreeling direction, and an electromagnetic clutch for transmitting the rotation of the drive motor to the rotary drum. The electromagnetic clutch is capable of variably setting a transmitting torque of rotation, and the transmitting torque is set to a value for cancelling a mechanical load in the unreeling direction of the fishing machine.

9 Claims, 6 Drawing Sheets

(51) Int. Cl.
  *A01K 89/015* (2006.01)
  *F16D 27/10* (2006.01)
  *F16D 27/00* (2006.01)

(58) Field of Classification Search
  CPC .............. F16D 2027/002; F16D 27/10; F16D 2500/30426; F16D 2500/70408; F16D 2500/70426; F16D 48/064
  See application file for complete search history.

(56) References Cited

U.S. PATENT DOCUMENTS

2014/0141880 A1\* 5/2014 Munakata ........... G07F 17/3258
  463/31
2019/0269118 A1\* 9/2019 Hamade ............... A01K 89/017

FOREIGN PATENT DOCUMENTS

| JP | 2010-273646 A | 12/2010 |
| JP | 2013-34397 A | 2/2013 |

\* cited by examiner

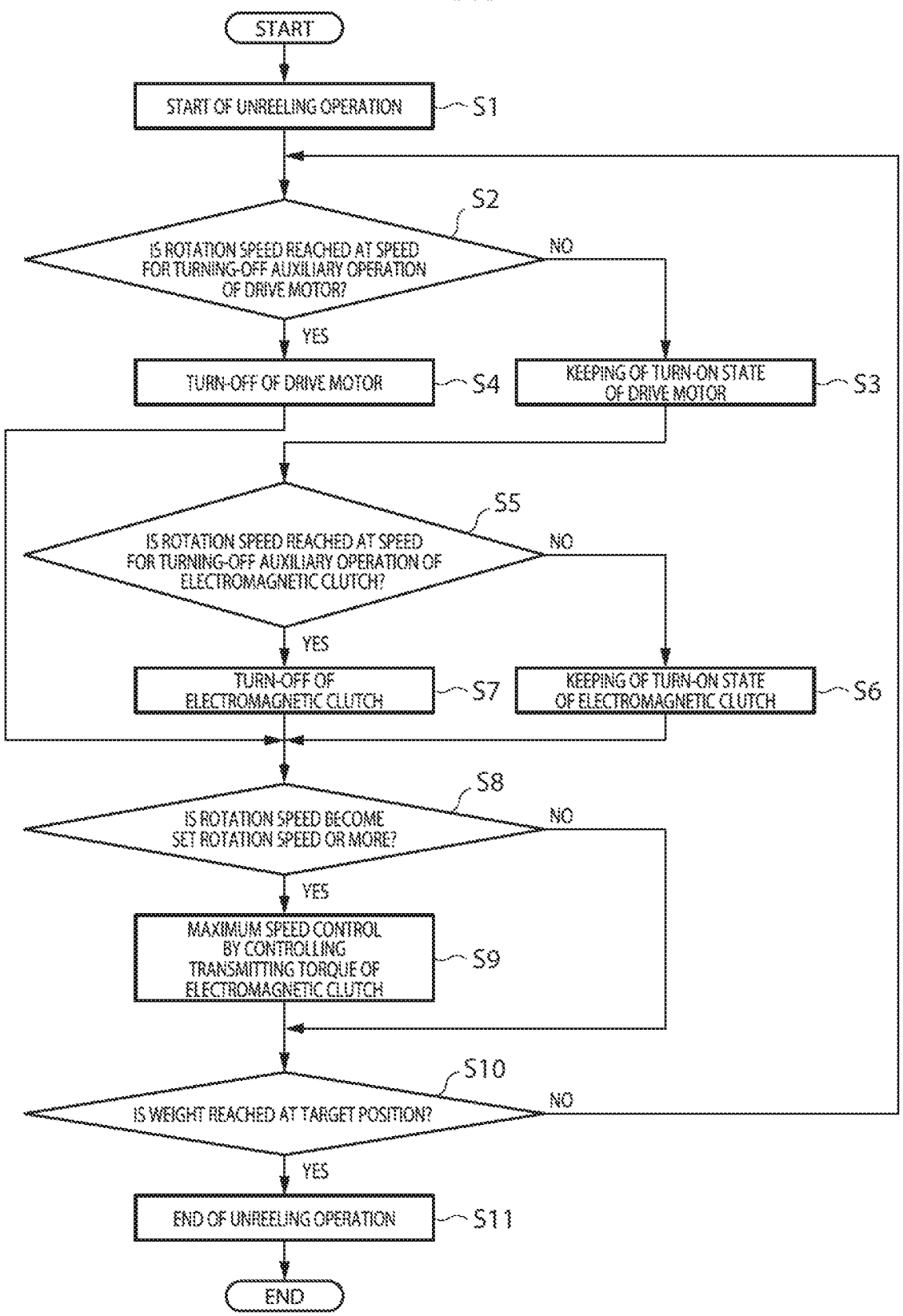

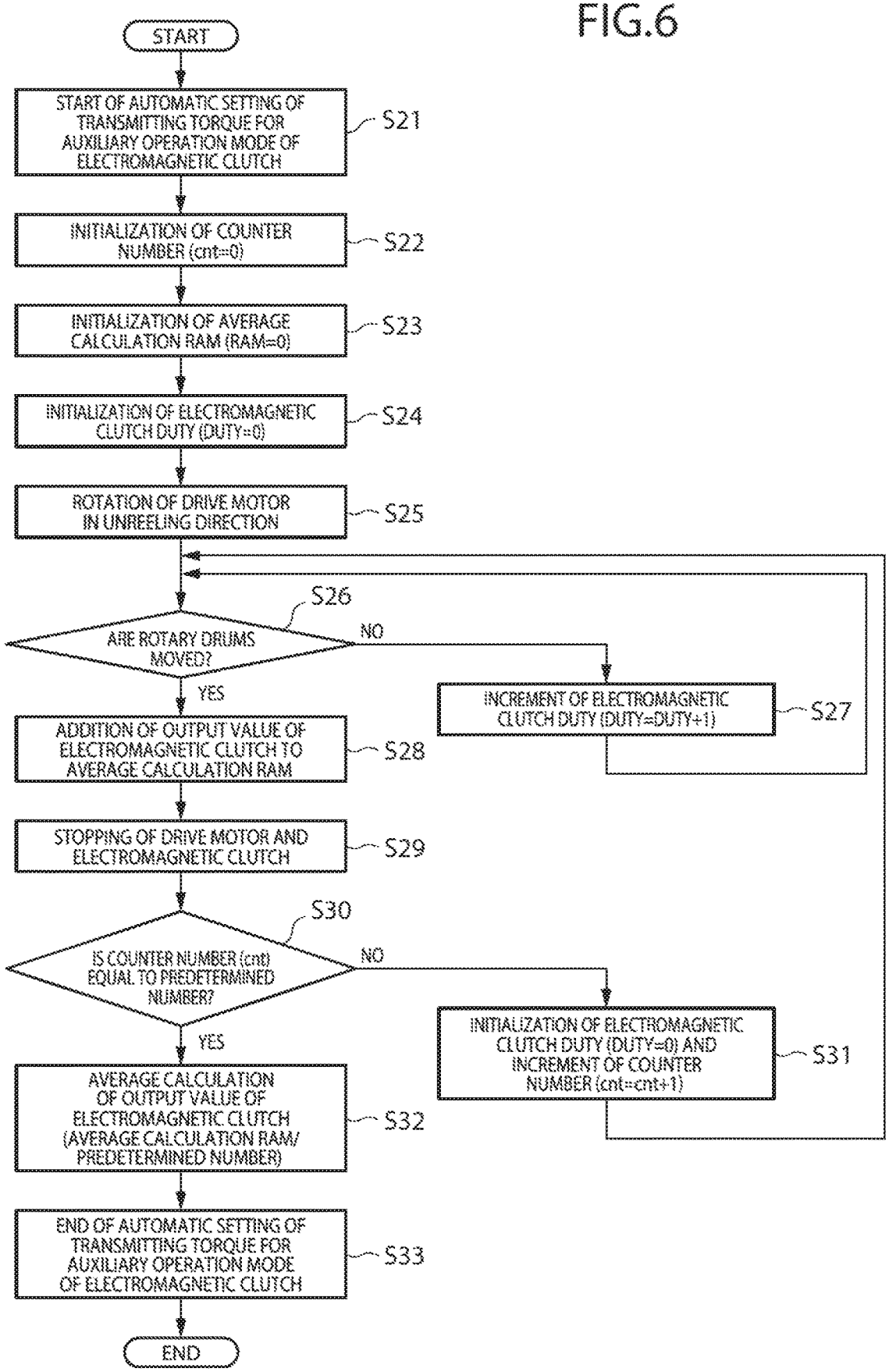

ized to gradually increase the transmitting torque of
FISHING MACHINE AND CONTROL METHOD OF FISHING MACHINE This application is a continuation of PCT Patent Application No. PCT/JP2017/001715, filed Jan. 19, 2017 and claims priority to Japanese Patent Application No. 2016-118454 filed on Jun. 15, 2016, the entire content of both of which is incorporated herein by reference.

BACKGROUND OF THE INVENTION

Field of the Invention

The present invention relates to a fishing machine mounted on a fishing boat for performing automatic fishing by rotating rotary drums for reeling and unreeling fishing lines, and a control method of the fishing machine.

Description of the Related Art

A fishing machine is provided with, in general, circular-shaped rotary drums having reeling sections with a circular axial cross-section for reeling fishing lines, a drive motor for rotating the circular-shaped rotary drums, and a control means for controlling the rotation of the drive motor. The drive motor will be in action only when the rotary drums reel the fishing lines but not in action when the rotary drums unreel the fishing lines. While the rotary drums unreel the fishing lines, weights (sinkers) or fishing gears connected to the respective fishing lines drop by their own weight and if the rotation speed of the rotary drums exceeds a predetermined speed, a powder clutch breaks the rotary drums.

The applicant has proposed in Patent Document 1 a fishing machine and its control method capable of suppressing an excess unreeling speed of the fishing lines over a required amount by controlling a voltage applied to an electromagnetic clutch so as to keep the tension of the fishing lines at a predetermined value when the rotary drums are unreeling.

More concretely, in the fishing machine described in Patent Document 1, a control unit calculates a rotation speed of the rotary drums from an output signal of a rotation-speed detector, and judges a rotating direction of the rotary drums. The control unit also calculates, based on the calculated rotation speed, a changing value of the voltage applied to the electromagnetic clutch, which is required to keep the tension of the fishing lines at a predetermined value when it is judged that the rotary drums rotate in the unreeling direction (reverse direction). Then, the control unit applies to the electromagnetic clutch a voltage calculated by adding the calculated changing value to a predetermined set value or by subtracting the calculated changing value from the predetermined set value so as to keep the tension of the fishing lines at a predetermined value.

RELATED ART DOCUMENT

Patent Document

Patent Document 1: Japanese Patent Publication No. 2007-104978A

PROBLEM TO BE SOLVED BY THE INVENTION

In the conventional fishing machine and in the fishing machine described in Patent Document 1, it was possible to drop the weights or the fishing gears by their own weight without problem if large diameter rotary drums (diameter of ϕ400 nm for example) and heavy weights (200-300 degrees for example) were used, However, it was impossible to rotate the rotary drums in the unreeling direction only by the weight of the their own weight resulting that it was difficult to perform automatic control of the fishing machine if small diameter rotary drums (diameter of ϕ280 nm for example) and light weights (120 degrees for example) were used. This phenomenon might be occurred because the mechanical load of the fishing machine was bigger than the external force due to the dropping weights or the dropping fishing gears. Such phenomenon might be prevented from occurring by a method of forcibly rotating the rotary drums in the unreeling direction. According to this method, however, since the rotary drums would continue rotating in the unreeling direction even when the weights did not drop due to for example catching of the fishing lines or the weights by the boat, the fishing lines might be tangled in the reeling sections or another sections such as the main axis of the rotary drums. Thus, it was difficult to put this method of forcibly and merely rotating the rotary drums in the unreeling direction to practical use.

SUMMARY OF THE INVENTION

The present invention intends to dissolve the aforementioned conventional problems, and an object of the present invention is to provide a fishing machine and a control method of the fishing machine whereby weights or sinkers can be smoothly started to drop so as to perform automatic fishing even when small diameter rotary drums and light weights are used.

According to the present invention, a fishing machine includes a rotary drum for winding a fishing line, capable of rotating in a reeling direction and in a unreeling direction, a drive motor for rotating the rotary drum in the reeling direction and in the unreeling direction, and an electromagnetic clutch for transmitting the rotation of the drive motor to the rotary drum. The electromagnetic clutch is capable of variably setting a transmitting torque of rotation, and the transmitting torque is set to a value for cancelling a mechanical load in the unreeling direction of the fishing machine.

Because the transmitting torque is set to a value for cancelling the mechanical load in the unreeling direction of the fishing machine, weight can be smoothly started to drop so as to perform automatic reeling and unreeling of a fishing line even when a small diameter rotary drum and a light weight are used.

It is preferred that the fishing machine further includes a rotation detector for detecting a rotation speed and a rotation direction of the rotary drum, and a control unit for controlling the drive motor and the electromagnetic clutch based on a detected result of the rotation detector. The control unit is configured to gradually increase the transmitting torque of the electromagnetic clutch from zero under the rotation of the drive motor, and to set the transmitting torque of the electromagnetic clutch to a value of the transmitting torque at the start of rotation of the rotary drum.

It is also preferred that the control unit has a rotation-speed calculation means for calculating a rotation speed of the rotary drum depending upon an output signal of the rotation detector, and a rotation-direction judgement means for judging a rotation direction of the rotary drum depending upon the output signal of the rotation detector. The control unit is configured to drive the rotary drum in the unreeling direction by means of the drive motor when the rotation speed calculated by the rotation-speed calculation means is less than a first predetermined rotation speed, while the rotation direction judged by the rotation-direction judgement means is in the unreeling direction, and to stop the drive of the rotary drum by means of the drive motor when the rotation speed calculated by the rotation-speed calculation means is equal to or more than the first predetermined rotation speed, while the rotation direction judged by the rotation-direction judgement means is in the unreeling direction.

In this case, it is preferred that the control unit further includes an applied-voltage change-amount calculation means for calculating a change amount of voltage applied to the electromagnetic clutch necessary for keeping the first predetermined rotation speed, based on the rotation speed calculated by the rotation-speed calculation means, when the rotation direction of the rotary drum judged by the rotation-direction judgement means is in the unreeling direction, and an applied-voltage adjustment means for increasing or decreasing the voltage applied to the electromagnetic clutch depending on the change amount calculated by the applied-voltage change-amount calculation means.

It is still further preferred that the control unit is configured to connect the electromagnetic clutch when the rotation speed calculated by the rotation-speed calculation means is less than a second predetermined rotation speed, while the rotation direction of the rotary drum is in the unreeling direction, and to disconnect the electromagnetic clutch when the rotation speed calculated by the rotation-speed calculation means is equal to or more than the second predetermined rotation speed, while the rotation direction of the rotary drum is in the unreeling direction.

It is further preferred that the control unit is configured to control the transmitting torque of the electromagnetic clutch so as to perform maximum speed control when the rotation speed calculated by the rotation-speed calculation means is equal to or more than a third predetermined rotation speed that is higher than the first predetermined rotation speed and the second predetermined rotation speed, while the rotation direction of the rotary drum is in the unreeling direction.

According to the present invention, further, a control method of a fishing machine that includes a rotary drum for winding a fishing line, capable of rotating in a reeling direction and in a unreeling direction, a drive motor for rotating the rotary drum in the reeling direction and in the unreeling direction, and an electromagnetic clutch for transmitting the rotation of the drive motor to the rotary drum is provided. According to the control method, a transmitting torque of rotation of the electromagnetic clutch is set to a value for cancelling a mechanical load in the unreeling direction of the fishing machine.

It is preferred that the transmitting torque of the electromagnetic clutch is gradually increased from zero under the rotation of the drive motor, and set to a value of the transmitting torque at the start of rotation of the rotary drum.

It is also preferred that the rotary drum is driven in the unreeling direction by means of the drive motor when the rotation speed of the rotary drum is less than a first predetermined rotation speed, while the rotation direction of the rotary drum is in the unreeling direction, and the drive of the rotary drum by means of the drive motor is stopped when the rotation speed of the rotary drum is equal to or more than the first predetermined rotation speed, while the rotation direction of the rotary drum is in the unreeling direction.

It is further preferred that the electromagnetic clutch is connected when the rotation speed of the rotary drum is less than a second predetermined rotation speed, while the rotation direction of the rotary drum is in the unreeling direction, and disconnected when the rotation speed of the rotary drum is equal to or more than the second predetermined rotation speed, while the rotation direction of the rotary drum is in the unreeling direction.

It is still further preferred that the transmitting torque of the electromagnetic clutch is controlled so as to perform maximum speed control when the rotation speed of the rotary drum is equal to or more than a third predetermined rotation speed that is higher than the first predetermined rotation speed and the second predetermined rotation speed, while the rotation direction of the rotary drum is in the unreeling direction.

EFFECT OF THE INVENTION

According to the present invention, because the transmitting torque is set to a value for cancelling a mechanical load in the unreeling direction of the fishing machine, a weight can be smoothly started to drop so as to perform automatic reeling and unreeling of a fishing line even when a small diameter rotary drum and a light weight are used.

BRIEF DESCRIPTION OF THE DRAWINGS

FIG. 5 is a flow chart illustrating an auxiliary unreeling operation of the fishing machine shown in FIGS. 1A and 1B when the fishing line is unreeled; and FIG. 6 is a flow chart illustrating an automatic setting operation of a torque for a clutch auxiliary operation mode of the fishing machine shown in FIGS. 1A and 1B.

DESCRIPTION OF THE PREFERRED EMBODIMENT

Hereinafter, an embodiment of a fishing machine and a control method of the fishing machine according to the present invention will be described with reference to the drawings.

Figure 1B:
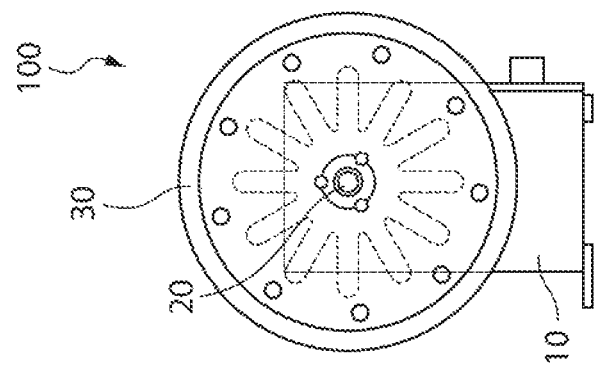
FIGS. 1A and 1B are a front view and a side view schematically illustrating a configuration of an embodiment of a fishing machine according to the present invention.
Figure 1A:
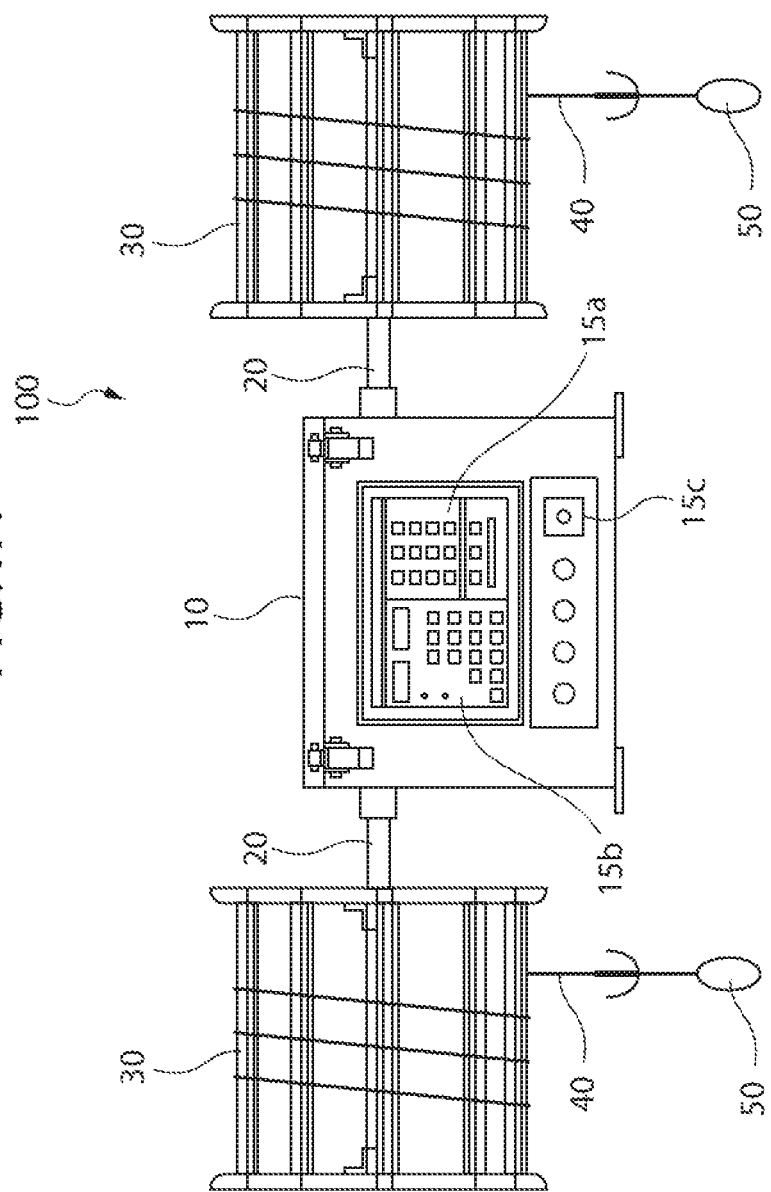
Figure 2:
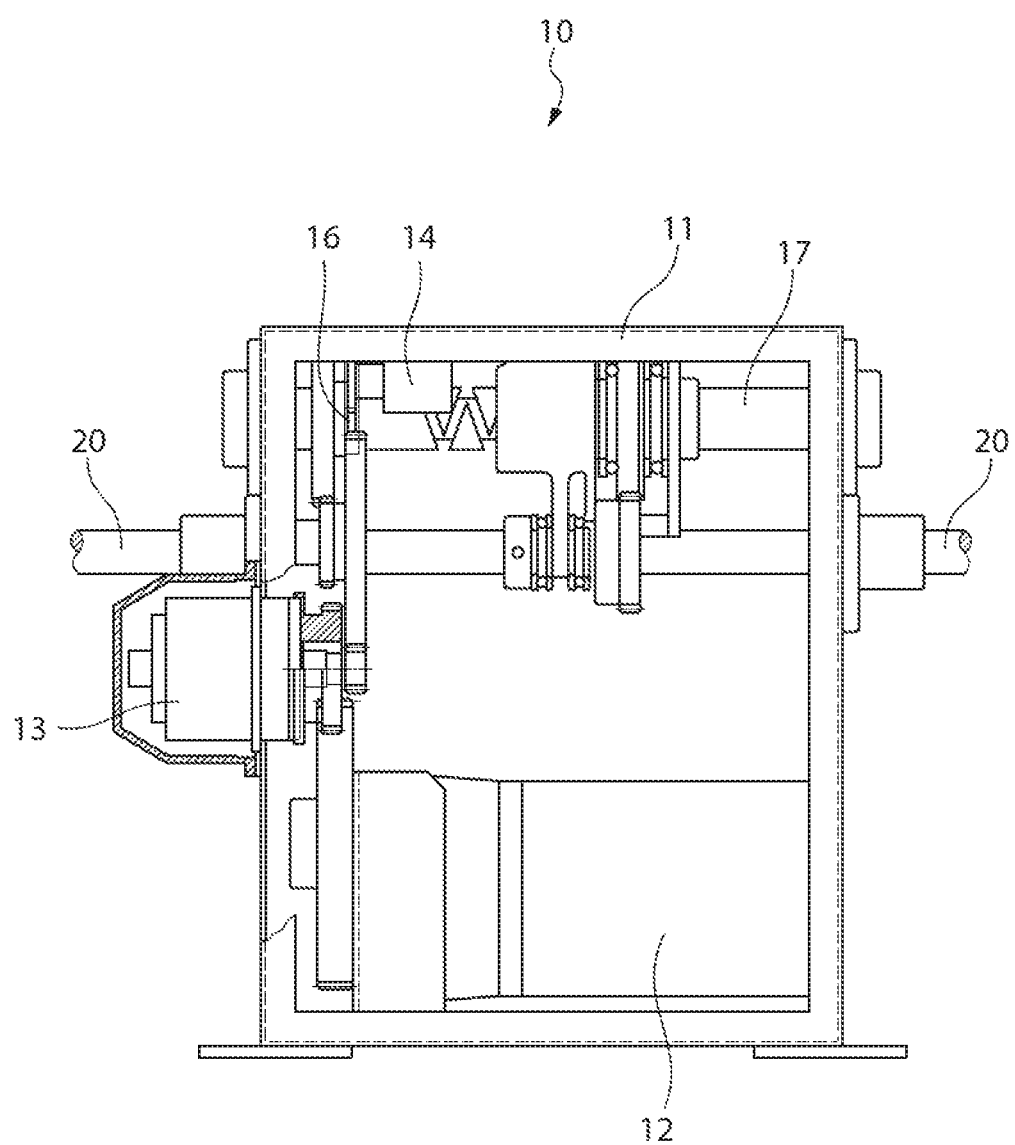
FIG. 2 is a front view schematically illustrating an internal structure of the fishing machine shown in FIGS. 1A and 1B.
Figure 3:
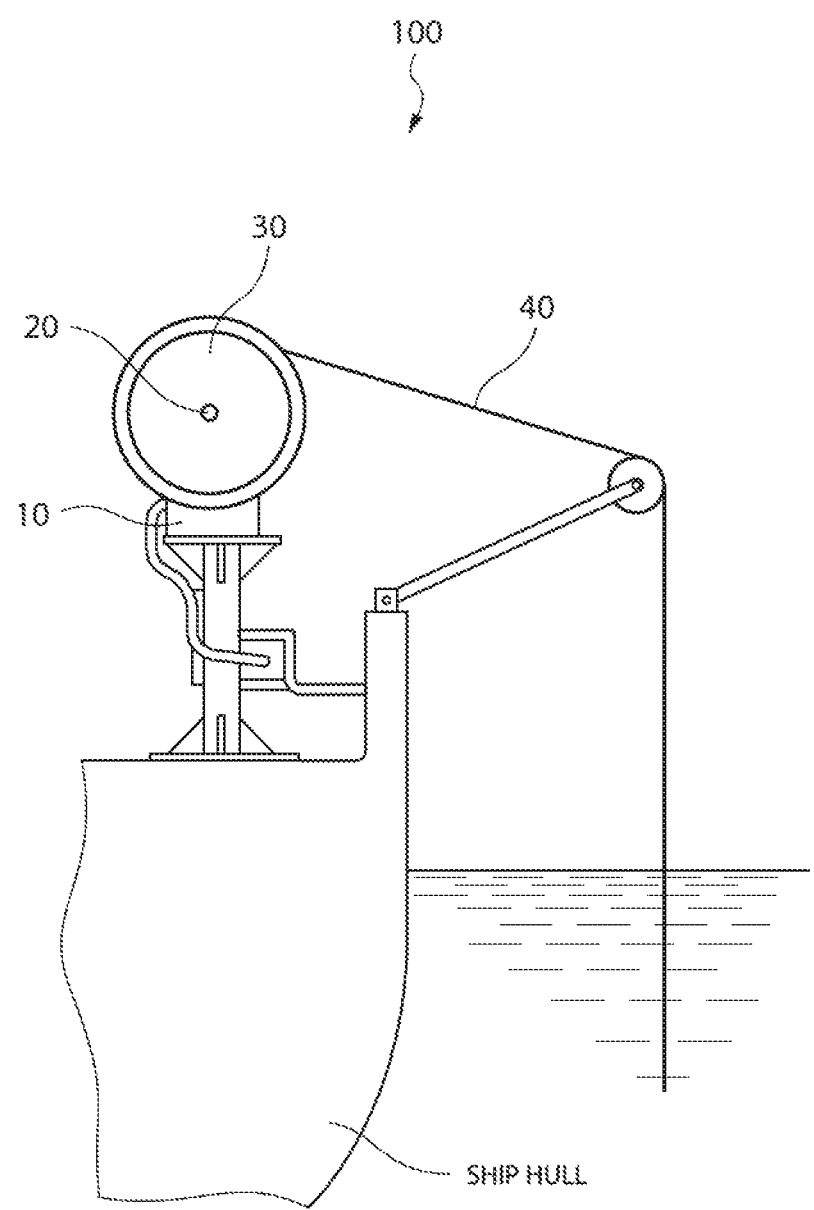
FIG. 3 is a side view schematically illustrating setting and operating states of the fishing machine shown in FIGS. 1A and 1B.
Figure 4:
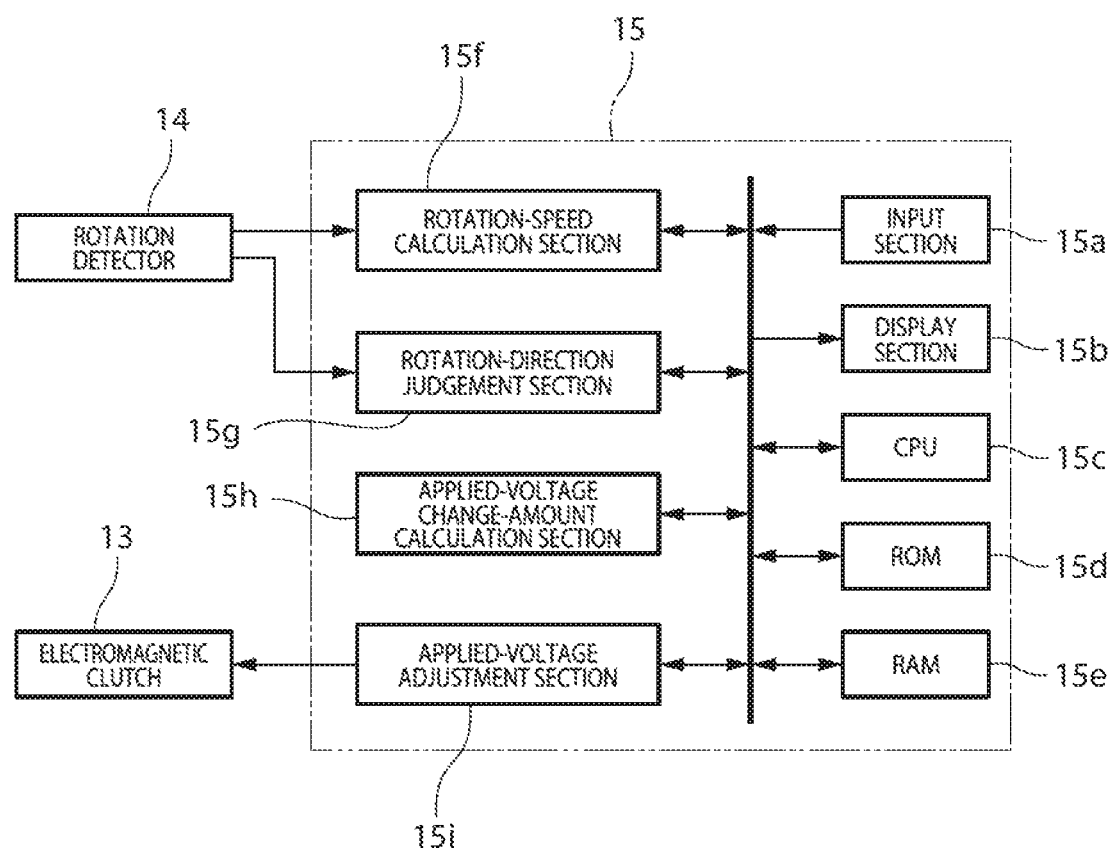
FIG. 4 is a block diagram schematically illustrating an electrical configuration of the fishing machine shown in FIGS. 1A and 1B.

FIGS. 1A and 1B and FIG. 2 illustrate configurations of a fishing machine 100 of an embodiment according to the present invention, FIG. 3 illustrates setting and operating states of the fishing machine 100, and FIG. 4 illustrates electrical configuration of the fishing machine 100.

As shown in FIGS. 1A, 1B and 3, the fishing machine 100 of this embodiment has a fishing machine body 10, a drum mounting axis 20, a pair of rotary drums 30 attached to the fishing machine body 10 through the drum mounting axis 20, a pair of fishing lines 40, and a pair of weights or sinkers 50. In this embodiment, the fishing machine 100 is a machine for hooking general fishes. However, the fishing machine according to the present invention may be applied to fish various fishes such as for example cuttlefish or squid.

As shown in FIG. 2, the fishing machine body 10 has a housing 11, a drive motor 12 arranged in the housing 10 for driving or rotating the rotary drums 30 shown in FIGS. 1A and 1B, an electromagnetic clutch 13 for transmitting the rotation of the drive motor 12 to the rotary drums 30, a rotation detector 14 for detecting a rotation speed and a rotation direction of the rotary drums 30, and a control unit 15 shown in FIG. 4 for controlling the drive motor 12 and the electromagnetic clutch 13 based on a detected result of the rotation detector 14.

A control panel of the control unit 15 is attached to the housing 11 as shown in FIG. 1A, and this control panel is provided with an input section 15a, a display section 15b and a power switch 15c.

As shown in FIG. 2, the drive motor 12 is installed in the lower part of the housing 11, and the driving force of this drive motor 12 is transmitted to the drum mounting axis 20 and a movable shaft 17 through the electromagnetic clutch 13 and a transmission gear. The movable shaft 17 rotates to move or displace the drum mounting axis 20 in right and left directions along the axis. The rotation detector 14 is coupled with the movable shaft 17 through a chain 16.

As for the electromagnetic clutch 13, a powder clutch may be used for example. The powder clutch is configured to fill small iron powders in a gap between a rotor of driving side and a rotor of driven side. These rotors are capable of being magnetized by an outside electromagnet. Because the rotors are not in contact directly with each other, no transmission of the power is carried out and thus the clutch is disengaged when the rotors are not magnetized. But since the powders (small iron powders) are attracted and filled in the gap between the rotors when the rotors are magnetized, the power is transmitted through the clutch. The transmitting torque of such clutch can be variably and finely controlled by regulating the magnetic force applied to the rotors. It should be noted that the electromagnetic clutch 13 is not limited to the powder clutch but may be configured by other clutch having the similar function.

The rotation detector 14 is configured by in this embodiment a rotary encoder for detecting the rotation speed and the rotation direction of the rotary drums 30.

As shown in FIG. 4, the control unit 15 has an input section 15a configured by a keyboard or else, a display section 15b configured by a liquid crystal display or else, a CPU 15c, a ROM 15d, a RAM 15e, a rotation-speed calculation section 15f for calculating the rotation speed of the rotary drum 30 from an output signal of the rotation detector 14, a rotation-direction judgement section 15g for judging, from the output signal of the rotation detector 14, the rotation direction of the rotary drums 30, that is, whether the rotation of the rotary drums 30 is in the reeling direction (normal rotation) or in the unreeling direction (reverse direction), an applied-voltage change-amount calculation section 15h for calculating a change amount of voltage applied to the electromagnetic clutch 13, which is necessary for keeping the rotation speed of the rotary drums 30 at a predetermined rotation speed, based on the rotation speed calculated by the rotation-speed calculation section 15f, when the rotation direction of the rotary drums 30 judged by the rotation-direction judgement section 15g is in the unreeling direction, and an applied-voltage adjustment section 15i for increasing or decreasing the voltage applied to the electromagnetic clutch 13 from the predetermined applied voltage, depending on the change amount calculated by the applied-voltage change-amount calculation section 15h.

The CPU 15c controls overall operations of the fishing machine 100, using the RAM 15e as a work area, in line with a control program stored in the ROM 15d.

The applied-voltage change-amount calculation section 15h is configured to calculate a change amount of voltage applied to the electromagnetic clutch 13, which is necessary for keeping the dropping speed of the fishing lines at a predetermined value, based on the obtained rotation speed, when it is judged that the rotary drums 30 reversely rotate. For example, the applied-voltage change-amount calculation section 15h calculates the product of the rotation speed obtained from the rotation-speed calculation section 15f with a predetermined constant corresponding to this rotation speed as the change amount of voltage applied to the electromagnetic clutch 13.

The applied-voltage adjustment section 15i increases or decreases the predetermined voltage set value (or the reeling force set value) for driving the electromagnetic clutch 13 by the change amount of the applied voltage, calculated by the applied-voltage change-amount calculation section 15h and applies the obtained voltage to the electromagnetic clutch 13.

The control unit 15 controls to drive the rotary drums 30 in the unreeling direction by means of the drive motor 12 when the rotation speed calculated by the rotation-speed calculation section 15f is less than a first predetermined rotation speed, while the rotation direction judged by the rotation-direction judgement section 15g is in the unreeling direction, and to stop the drive of the rotary drums 30 by means of the drive motor 12 when the rotation speed calculated by the rotation-speed calculation section 15f is equal to or more than the first predetermined rotation speed, while the rotation direction judged by the rotation-direction judgement section 15g is in the unreeling direction. Also, the control unit 15 controls to connect the electromagnetic clutch 13 when the rotation speed calculated by the rotation-speed calculation section 15f is less than a second predetermined rotation speed, while the rotation direction of the rotary drums 30 is in the unreeling direction, and to disconnect the electromagnetic clutch 13 when the rotation speed calculated by the rotation-speed calculation section 15f is equal to or more than the second predetermined rotation speed, while the rotation direction of the rotary drums 30 is in the unreeling direction.

Further, the control unit 15 can automatically set the transmitting torque of the electromagnetic clutch 13 to a transmitting torque for auxiliary operation mode of the electromagnetic clutch 13 (clutch-auxiliary operation mode). Setting of the transmitting torque for the clutch-auxiliary operation mode may be automatically performed by the control unit 15 as described later or may be manually performed by the operator. In case of manually performing the setting, the transmitting torque of the electromagnetic clutch 13 is gradually increased from zero while the drive motor 12 is driven to rotate the rotary drums 30 in the unreeling direction, and a torque value when the rotary drums 30 starts the rotation is set to the electromagnetic clutch 13 as a transmitting torque for clutch-auxiliary operation mode.

The drum mounting axis 20 is installed to pass through the housing 11 of the fishing machine body 10. At the both end portions of the drum mounting axis 20, the rotary drums 30 are mounted, respectively.

Each rotary drum 30 is configured by a circular-shaped rotary drum having a reeling section 31 with a circular axial cross-section for winding a fishing line. The rotary drum 30 is driven to rotate in appropriate directions by the fishing machine body 10 and thus the fishing line 40 is reeled and unreeled. A hook with a lure tackle such as a branched line hook or artificial hooks for squid is attached to the fishing line 40. Also, the weight 50 is attached to the tip of the fishing line 40.

Hereinafter the control method of the fishing machine 100 when the unreeling of the fishing line 40 is performed will be described with reference to the accompanying drawings. FIG. 5 illustrates program flow of an auxiliary unreeling operation of the fishing machine 100 when the fishing lines are unreeled.

At first, an unreeling operation to drop undersea the fishing lines 40 is performed. That is, a power switch is turned on to rotate the drive motor 12 in the unreeling direction (to perform motor auxiliary operation) so as to start the unreeling operation of the fishing lines 40 (Step S1 of FIG. 5). Thus, the rotary drums 30 start the rotation in the unreeling direction to drop undersea the fishing lines 40 with the weights 50 attached at their tip. In this case, because the transmitting torque of the electromagnetic clutch 13 is set to the transmitting torque for clutch-auxiliary operation mode, a mechanical load of the fishing machine in the unreeling direction is cancelled. Thus, the weights 50 can be smoothly started to drop even when small diameter rotary drums and light weights are used. As a result, automatic reeling and unreeling operations of the fishing lines 40 can be performed without inviting any problem.

Then, whether the rotation speed of the rotary drums 30 is reached at a rotation speed (first rotation speed, for example 100 rpm) for turning-off the motor-auxiliary operation by the drive motor 12 or not is judged (Step S2). When it is judged that the rotation speed of the rotary drums 30 is not reached at the first rotation speed (in case of NO), the program advances to Step S3 at which the drive motor 12 is kept in turn-on state. The drive motor 12 thereby continues the motor-auxiliary operation wherein the rotary drum 30 is rotating in the unreeling direction. On the other hand, when it is judged that the rotation speed of the rotary drums 30 is reached at the first rotation speed (in case of YES), the program advances to Step S4 at which the drive motor 12 is turned-off and then the program advances to Step S8. The rotary drums 30 are thereby not driven by the drive motor 12 although they are still connected to the electromagnetic clutch 13.

In case that the drive motor 12 is kept in the turn-on state at Step S3, whether the rotation speed of the rotary drums 30 is reached at a rotation speed (second rotation speed, for example 100 rpm) for turning-off the clutch-auxiliary operation of the electromagnetic clutch 13 or not is judged (Step S5). When it is judged that the rotation speed of the rotary drums 30 is not reached at the second rotation speed (in case of NO), the program advances to Step S6 at which the electromagnetic clutch 13 is kept in turn-on state. The rotary drums 30 thereby continue the clutch-auxiliary operation wherein the rotary drums 30 connected under the transmitting torque of the electromagnetic clutch 13 are driven to rotate in the unreeling direction. On the other hand, when it is judged that the rotation speed of the rotary drums 30 is reached at the second rotation speed (in case of YES), the program advances to Step S7 at which the electromagnetic clutch 13 is turned-off. The rotary drums 30 become thereby free and rotate by own weight of the weights 50.

Then, whether the rotation speed of the rotary drums 30 becomes a predetermined set speed (third rotation speed, for example 200 rpm) or more that is higher than the first rotation speed and the second rotation speed or not is judged (Step S8). When it is judged that the rotation speed of the rotary drums 30 is not the third rotation speed nor more (in case of NO), the program advances to Step S10. On the other hand, when it is judged that the rotation speed of the rotary drums 30 becomes the third rotation speed or more (in case of YES), the program advances to Step S9 at which the transmitting torque of the electromagnetic clutch 13 is controlled so that the rotation speed of the rotary drum 30 will not reach the set maximum speed (PI control). Then, whether the weights 50 connected at the tip of the fishing lines 40 are arrived at a target position or not is judged (Step S10). When it is judged that the weights 50 at the tip of the fishing lines 40 are arrived at the target position (in case of YES), the unreeling operation of the fishing lines 40 is ended (Step S11). On the other hand, when it is judged that the weights 50 are not arrived at the target position (in the case of NO), the program returns to Step S2 and repeats the above-mentioned processes from Step S2 to Step S10.

An automatic setting operation of the transmitting torque for the clutch-auxiliary operation mode of the electromagnetic clutch 13 will be hereinafter described. FIG. 6 illustrates program flow of automatic setting operation of the clutch-auxiliary operation mode torque in the fishing machine 100.

At first, automatic setting operation of the transmitting torque for the clutch-auxiliary operation mode is started (Step S21). Then, a counter variable number cnt is initialized as cnt=0 (Step S22). Then, a value RAM for average calculation is initialized as RAM=0 (Step S23). Then, an electromagnetic clutch duty DUTY of the electromagnetic clutch 13 is initialized as DUTY=0 (Step S24). Then, the drive motor 12 is driven to rotate in the unreel direction (Step S25). Thereafter, whether the rotary drums 30 are moved or not is judged (Step S26).

When it is judged that the rotary drums 30 are not moved at Step S26 (in case of NO), DUTY of the electromagnetic clutch 13 is incremented by one as DUTY=DUTY+1 (Step S27). Then, the abovementioned processes of Steps S26 and S27 are repeated. On the other hand, when it is judged that the rotary drums 30 are moved at Step S26 (in case of YES), the output value of the electromagnetic clutch 13 is added to the value RAM for average calculation (Step S28). Then, the drive motor 12 and the electromagnetic clutch 13 are temporally stopped (Step S29). Then, it is judged whether the counter variable number cnt is equal to a predetermined number or not (Step S30).

When it is judged that the counter variable number cnt is not equal to the predetermined number at Step S30 (in case of NO), the electromagnetic clutch duty DUTY of the electromagnetic clutch 13 is initialized as DUTY=0 and the counter variable number cnt is incremented by one as cnt=cnt+1 (Step S31). Then, the abovementioned processes of Steps S26 to S31 are repeated. On the other hand, when it is judged that the counter variable number cnt is equal to the predetermined number at Step S30 (in case of YES), an average value of the output value of the electromagnetic clutch 13 is calculated (value RAM for average calculation/ predetermined number) (Step S32). Then, the automatic setting operation of the transmitting torque for the clutch-auxiliary operation mode is ended (Step S33).

As discussed above, the fishing machine 100 of this embodiment 100 has the fishing machine body 10, the drum mounting axis 20, the pair of rotary drums 30 attached to the fishing machine body 10 through the drum mounting axis 20, the pair of fishing lines 40, and the pair of weights or sinkers 50. The fishing machine body 10 has the housing 11, the drive motor 12, the electromagnetic clutch 13, the rotation detector 14 and the control unit 15. The control unit 15 has the rotation-speed calculation section 15*f* for calculating the rotation speed of the rotary drums 30 from the output signal of the rotation detector 14, and the rotation-direction judgement section 15*g* for judging, from the output signal of the rotation detector 14, the rotation direction of the rotary drums 30. When it is judged that the rotation speed of the rotary drums 30 obtained from the rotation-speed calculation section 15f is less than the predetermined speed and that the rotating direction of the rotary drums 30 is in the unreeling direction from the rotation-direction judgement section 15g, it is controlled that the rotary drums 30 are driven by the drive motor 12 to rotate in the unreeling direction. When it is judged that the rotation speed of the rotary drums 30 obtained from the rotation-speed calculation section 15f is equal to or more than the predetermined speed and that the rotating direction of the rotary drum 30 is in the unreeling direction from the rotation-direction judgement section 15g, it is controlled that the drive motor 12 is stopped.

Therefore, the weights or the sinkers can be smoothly started to drop and thus automatic reeling and unreeling of the fishing line can be performed even when small diameter rotary drums and light weights are used.

It should be noted that the fishing machine 100 of this embodiment is configured that the pair of rotary drums 30 is attached to the drum mounting axis 15. However, the present invention is not limited to this configuration. For example, a single rotary drum 30 may be attached to the drum mounting axis 15.

Also, the fishing machine 100 of this embodiment is configured to have an automatic setting mode of the clutch-auxiliary operation. However, the present invention is not limited to this example.

Further, the fishing machine 100 of this embodiment is configured to have a machine for hooking general fishes. However, the fishing machine according to the present invention may be applied to fish various fishes such as for example cuttlefish or squid.

Many widely different embodiments of the present invention may be constructed without departing from the spirit and scope of the present invention. It should be understood that the present invention is not limited to the specific embodiments described in the specification, except as defined in the appended claims.

INDUSTRIAL APPLICABILITY

The present invention can be utilized for a fishing machine having rotary drums with a small diameter, and a light weight.

The invention claimed is:

1. A fishing machine comprising:
a rotary drum for winding a fishing line, capable of rotating in a reeling direction and in a unreeling direction;
a drive motor for rotating said rotary drum in the reeling direction and in the unreeling direction;
an electromagnetic clutch for transmitting the rotation of said drive motor to said rotary drum;
a rotation detector for detecting a rotation speed and a rotation direction of said rotary drum; and
a control unit for controlling said drive motor and said electromagnetic clutch based on a detected result of said rotation detector,
said electromagnetic clutch being capable of variably setting a transmitting torque of rotation, the transmitting torque being set to a value for cancelling a mechanical load in the unreeling direction of said fishing machine,
said control unit being configured to gradually increase the transmitting torque of said electromagnetic clutch from zero under the rotation of said drive motor, and to set the transmitting torque of said electromagnetic clutch to a value of the transmitting torque at the start of rotation of said rotary drum.

2. The fishing machine as claimed in claim 1, wherein said control unit has a rotation-speed calculation means for calculating a rotation speed of said rotary drum depending upon an output signal of said rotation detector, and a rotation-direction judgement means for judging a rotation direction of said rotary drum depending upon the output signal of said rotation detector, and wherein said control unit is configured to drive said rotary drum in the unreeling direction by means of said drive motor when the rotation speed calculated by said rotation-speed calculation means is less than a first predetermined rotation speed, while the rotation direction judged by said rotation-direction judgement means is in the unreeling direction, and to stop the drive of said rotary drum by means of said drive motor when the rotation speed calculated by said rotation-speed calculation means is equal to or more than the first predetermined rotation speed, while the rotation direction judged by said rotation-direction judgement means is in the unreeling direction.

3. The fishing machine as claimed in claim 2, wherein said control unit further comprises an applied-voltage change-amount calculation means for calculating a change amount of voltage applied to said electromagnetic clutch necessary for keeping the first predetermined rotation speed, based on the rotation speed calculated by said rotation-speed calculation means, when the rotation direction of said rotary drum judged by said rotation-direction judgement means is in the unreeling direction, and an applied-voltage adjustment means for increasing or decreasing the voltage applied to said electromagnetic clutch depending on the change amount calculated by said applied-voltage change-amount calculation means.

4. The fishing machine as claimed in claim 3, wherein said control unit is configured to connect said electromagnetic clutch when the rotation speed calculated by said rotation-speed calculation means is less than a second predetermined rotation speed, while the rotation direction of said rotary drum is in the unreeling direction, and to disconnect said electromagnetic clutch when the rotation speed calculated by said rotation-speed calculation means is equal to or more than the second predetermined rotation speed, while the rotation direction of said rotary drum is in the unreeling direction.

5. The fishing machine as claimed in claim 4, wherein said control unit is configured to control the transmitting torque of said electromagnetic clutch so as to perform maximum speed control when the rotation speed calculated by said rotation-speed calculation means is equal to or more than a third predetermined rotation speed that is higher than said first predetermined rotation speed and said second predetermined rotation speed, while the rotation direction of said rotary drum is in the unreeling direction.

6. A control method of a fishing machine including a rotary drum for winding a fishing line, capable of rotating in a reeling direction and in a unreeling direction; a drive motor for rotating said rotary drum in the reeling direction and in the unreeling direction; and an electromagnetic clutch for transmitting the rotation of said drive motor to said rotary drum,
a transmitting torque of rotation of said electromagnetic clutch being set to a value for cancelling a mechanical load in the unreeling direction of said fishing machine, the transmitting torque of said electromagnetic clutch being gradually increased from zero under the rotation of said drive motor, and set to a value of the transmitting torque at the start of rotation of said rotary drum.

7. The control method of a fishing machine as claimed in claim 6, wherein said rotary drum is driven in the unreeling direction by means of said drive motor when the rotation speed of said rotary drum is less than a first predetermined rotation speed, while the rotation direction of said rotary drum is in the unreeling direction, and to stop the drive of said rotary drum by means of said drive motor when the rotation speed of said rotary drum is equal to or more than the first predetermined rotation speed, while the rotation direction of said rotary drum is in the unreeling direction.

8. The control method of a fishing machine as claimed in claim 7, wherein said electromagnetic clutch is connected when the rotation speed of said rotary drum is less than a second predetermined rotation speed, while the rotation direction of said rotary drum is in the unreeling direction, and said electromagnetic clutch is disconnected when the rotation speed of said rotary drum is equal to or more than the second predetermined rotation speed, while the rotation direction of said rotary drum is in the unreeling direction.

9. The control method of a fishing machine as claimed in claim 8, wherein the transmitting torque of said electromagnetic clutch is controlled so as to perform maximum speed control when the rotation speed of said rotary drum is equal to or more than a third predetermined rotation speed that is higher than said first predetermined rotation speed and said second predetermined rotation speed, while the rotation direction of said rotary drum is in the unreeling direction.

\* \* \* \* \*